(12) United States Patent
Millard et al.

(10) Patent No.: US 7,680,769 B2
(45) Date of Patent: Mar. 16, 2010

(54) METHOD OF CREATING A DATABASE AND SEARCH KEYS AND FOR SEARCHING THE DATABASE

(75) Inventors: Thomas A. Millard, Cary, NC (US); Francis E. Noel, Jr., Durham, NC (US); Norman C. Strole, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1759 days.

(21) Appl. No.: 10/341,770

(22) Filed: Jan. 14, 2003

(65) Prior Publication Data

US 2004/0139062 A1    Jul. 15, 2004

(51) Int. Cl.
*G06F 15/16* (2006.01)
*G06F 17/30* (2006.01)
*G06F 7/00* (2006.01)
*G06F 17/00* (2006.01)

(52) U.S. Cl. .................. 707/3; 707/104.1; 707/10; 709/201

(58) Field of Classification Search .............. 707/3, 707/104.1, 10; 709/201
See application file for complete search history.

(56) References Cited

U.S. PATENT DOCUMENTS

| | | | |
|---|---|---|---|
| 5,509,131 A * | 4/1996 | Smith et al. ............ | 711/206 |
| 5,796,944 A | 8/1998 | Hill et al. ............. | 395/200.8 |
| 5,835,720 A * | 11/1998 | Nelson et al. .......... | 709/224 |
| 5,941,969 A | 8/1999 | Ram et al. ............. | 710/128 |
| 5,956,336 A * | 9/1999 | Loschke et al. ........ | 370/392 |
| 6,081,522 A * | 6/2000 | Hendel et al. .......... | 370/389 |
| 6,081,883 A | 6/2000 | Popelka et al. ......... | 712/28 |
| 6,161,144 A * | 12/2000 | Michels et al. ......... | 709/238 |
| 6,226,710 B1 * | 5/2001 | Melchior ............... | 711/108 |
| 6,374,326 B1 * | 4/2002 | Kansal et al. .......... | 711/108 |
| 6,460,120 B1 | 10/2002 | Bass et al. ............. | 711/148 |
| 6,744,652 B2 * | 6/2004 | Srinivasan et al. ...... | 365/49 |

OTHER PUBLICATIONS

Taylor et al. "System-on-Chip Packet Processor for an Experimental Network Services Platform." Proceedings of IEEE Globecom (2003).*

* cited by examiner

*Primary Examiner*—Apu M Mofiz
*Assistant Examiner*—Charles E Lu
(74) *Attorney, Agent, or Firm*—Patrick J. Daugherty; Driggs, Hogg, Daugherty & Del Zoppo Co., LPA

(57) ABSTRACT

A searchable information database is provided. At least one network processor having one or more packet processors is provided which are programmed to independently search for a match of any one of the keys in a key set which is delivered to the network processor(s). Each key set is independently identifiable and searchable. If a match is found, then either a function associated therewith or a pointer to the location of the information in the database is returned. Several searching techniques can be used. For example, multiple network processors can be used, with each storing the keys of a different set of keys, and each set of keys can be searched concomitantly in the network processors. Alternatively, a large lookup table may distribute multiple network processors. If a single network processor is used, the key sets can be pipeline searched, or pico processors or packet processors can independently search each key set.

13 Claims, 3 Drawing Sheets

US 7,680,769 B2

METHOD OF CREATING A DATABASE AND SEARCH KEYS AND FOR SEARCHING THE DATABASE

FIELD OF THE INVENTION

This invention relates generally to data look-up or data mining techniques and is especially adapted for rapid data look-up or data mining techniques in large databases.

BACKGROUND OF THE INVENTION

Database applications, in one current widely used embodiment, are executed on a single general-purpose processor (GPP) for accessing and retrieving information. This limits the number of database accesses per unit time based on the processing capacity of the GPP. These applications often utilize a variable length key to access information within the database. For example, the key may include any number or all of the following: telephone number; social security number; license plate number; employee serial number; name; address; medical record number; account number; or a virtual memory page on a DASD application. With current techniques, searching on all of these keys is time consuming and inefficient.

SUMMARY OF THE INVENTION

According to the present invention, a searchable database is provided for containing information in a conventional manner. At least one network processor having a plurality of packet processors is provided. The network processor or processors are programmed to independently search for a match of any one of the keys in a key set, which sets of keys are delivered to the network processor or processors. Each key set is independently identifiable and searchable. If a match to a key is found, then either the name associated therewith or a pointer to the location of the information in the database, which could be a routing table database, is returned. There are several searching techniques that can be used. For example, multiple network processors can be used, with each storing a different set of keys, and each set of keys can be searched concomitantly in the network processors. This can be accomplished by providing the entire set of keys to each network processor and letting each network processor select which key set it is programmed to handle; or a separate classifier can be used to select which key set to send to which network processor. If a single network processor is used, the key sets can be searched in a pipeline configuration or, if desired, since a network processor typically contains several packet processors, these packet processors can independently search each key set concomitantly. In all of the embodiments, however, the inherent speed of a network processor is utilized in a data search or data mining operation rather than in a communications network.

DESCRIPTION OF THE PREFERRED EMBODIMENTS

Before describing the invention in detail, it is believed that an overview of the principles of the invention would be helpful. The invention makes use of the fact that the network processors are very rapid, and can do searches on different fields concomitantly, and that multiple keys can be used to access a given record in a database, and that these keys can be segmented in a search request for identification of data corresponding thereto in a database. For example, the data in a database could relate to a particular person, and that information can be accessed by any one of a number of keys, such as social security number, telephone number, street address, license number, etc. If a third party, authorized to access the database, has some of these keys and wishes to access the information in the database relating to that person, those keys can be keyed into the proper key field for database access, and have each of the individual keys searched to see if there is a match in the database. These searches of the various keys can be done concomitantly and any match quickly returned.

Figure 1:
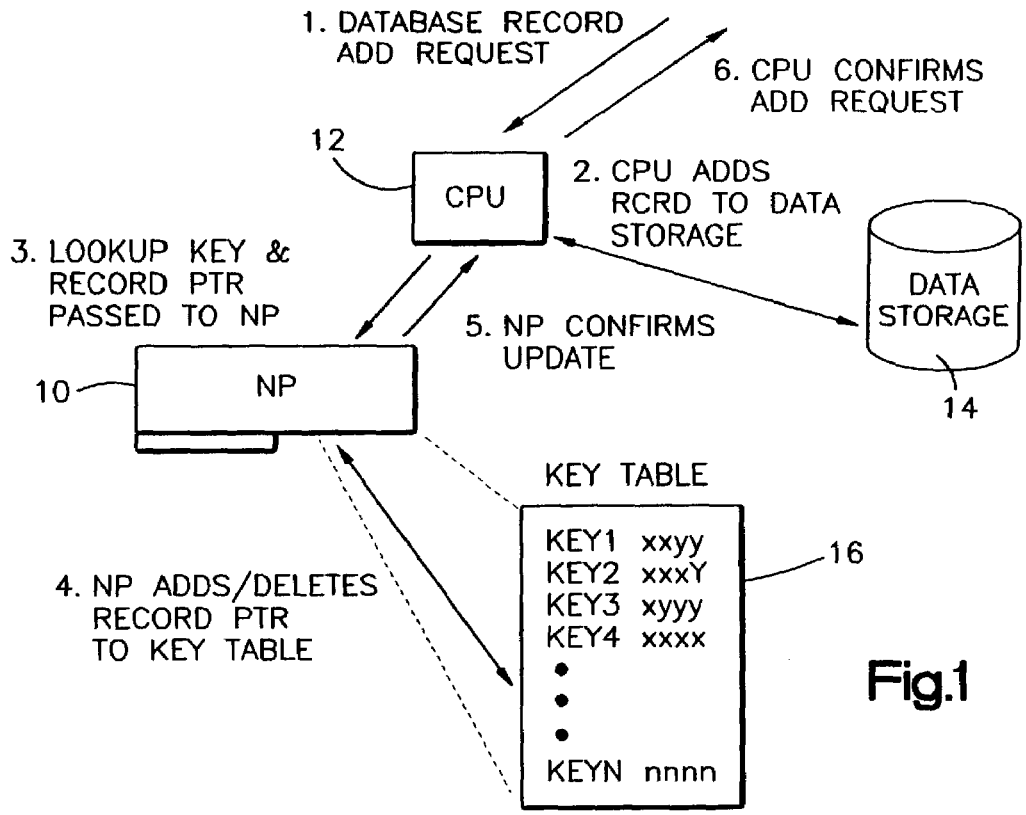
FIG. 1 is a representation of the present invention utilizing a single network processor with the technique of adding or deleting a database entry and associated keys.

Referring now to FIG. 1, a high level representation of a database record add or delete scheme for the present invention, together with the associated components of one embodiment of this invention, is shown. A network processor (NP) 10 is provided which contains several pico processors or packet processors (not shown), all of which are conventional in design and need not be described in detail. U.S. Pat. No. 6,460,120 B1, which is incorporated herein by reference, shows one embodiment of a network processor suitable for use in this invention. Of course, other network processors could be used. A central processing unit (CPU) 12 is also provided which is connected to the network processor 10 and to a conventional main storage unit 14 for storing information, such as personnel records. The NP 10 includes a key table 16 which contains the keys of one of the sets, e.g. telephone numbers and a pointer to the location in storage unit 14 having the records associated with each particular key. (Each key could have associated therewith the name of the person or some function, rather than a pointer to the database, depending upon the application.) The NP 10 preferably is a separate card or component that may be located in the same enclosure with the CPU 12, or it may be physically separated and accessed via a network link.

The information flow is as shown in FIG. 1 for adding to or deleting from the database storage 14 and the key table 16. A database add or delete request is generated by some external source which is unique to the database storage structure 14, including all the keys which can be used to access the database storage 14 and delivered to the CPU 12. This is conventional prior art. The CPU creates a new database entry for, or deletes an existing entry from, the database 14 depending upon the instruction. This also is conventional prior art.

The CPU 12 creates one or more look-up keys along with a pointer to the record storage location of that data in the main storage 14, and delivers these to the appropriate key table or tables; or the CPU 12 deletes any keys and associated pointers from the appropriate key table or tables. The NP 10 retrieves the pointer from the key table 16 and confirms the address in the main storage 14. The NP 10 then confirms to the CPU that the entry has been completed (or failed if such is the case).

The CPU 12 may, if desired, confirm to the user the completion of the "add" or "delete" request. This is all set forth in the interaction shown in FIG. 1.

Figure 2:
FIG. 2 is a representation of an information field including access information keys and other sub fields.

FIG. 2 is a representation of the keys contained in the database access request to the NP 10. The information may be in conventional packet format, such as Ethernet, or it may be customized into any format that allows the different fields to be parsed and identified. The MAC header field designates the format of the packets; the Type field provides the means for the CPU to communicate with the NP 10, which field or fields are to be used as a basis for look-up; the record Pointer field provides an area for the NP 10 to return a pointer or name to the CPU; the fields Field 1, Field 2 . . . Field n provide for the keys or key sets to be associated with the stored data; and the MACFCS field provides for data transmission integrity by containing the Frame Check Sequence.

Figure 3:
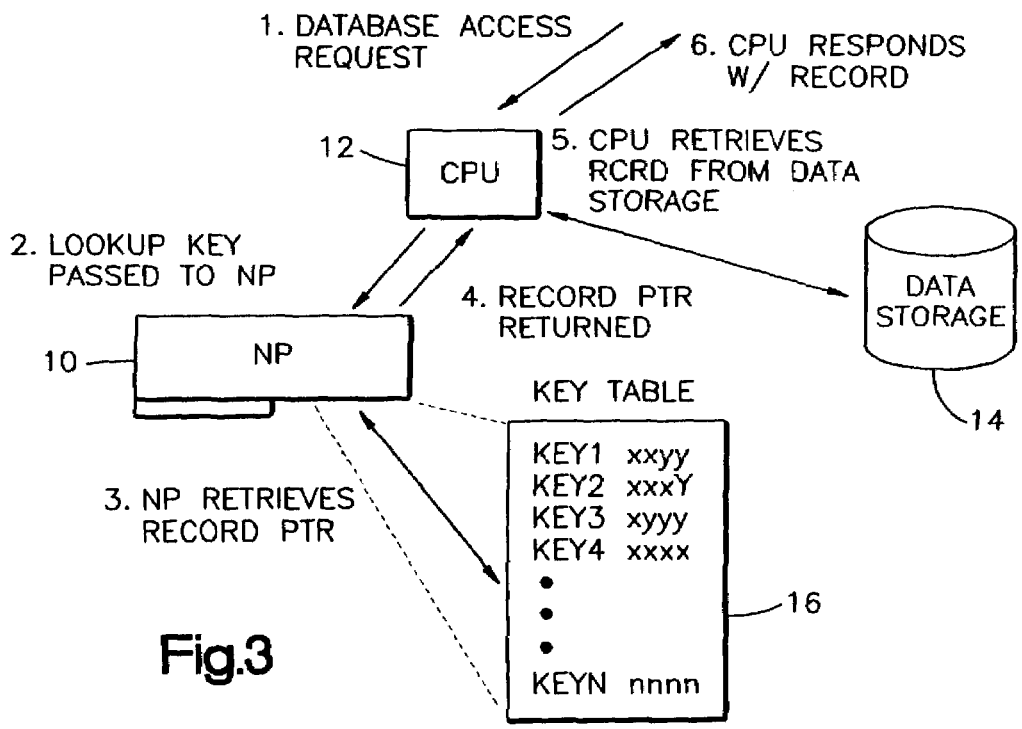
FIG. 3 is a representation of the present invention using a single network processor showing a database access request.
Figure 4:
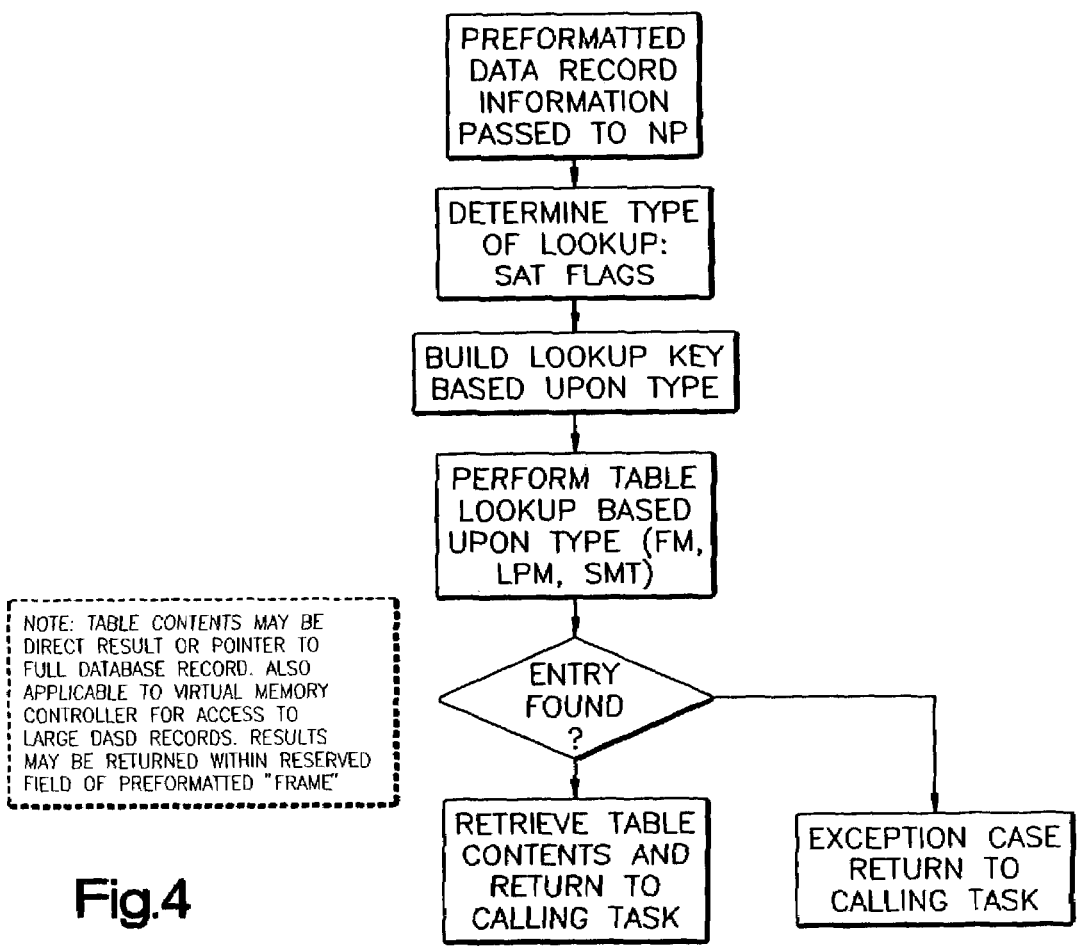
FIG. 4 is a flow chart of the program for searching on keys for database access request.

FIG. 3 shows how a database access Request is handled where a single Network processor 10 is used. The database access is supplied to the CPU 12. The CPU passes the look-up key set to the NP 10. The NP 10 based on the information in the field as shown in FIG. 2 searches the Key table or tables 16 associated with to keys passed to the NP 10. In the embodiment of FIG. 3, the NP 10 returns a pointer to the main storage for the corresponding record, which the CPU retrieves from main storage 14, and delivers to the requester. In accessing the key tables, when there is more than one table 16, each of the tables could be searched concomitantly by a different one of the packet processors, and any "hits" returned to the CPU. FIG. 4 depicts a flow chart for searching a single network processor embodiment of this invention. FM stands for Fixed Mode, LPM for Longest Prefix Match, and SMT for Software Managed Tree. These are techniques for optimally searching the lookup table.

Figure 5:
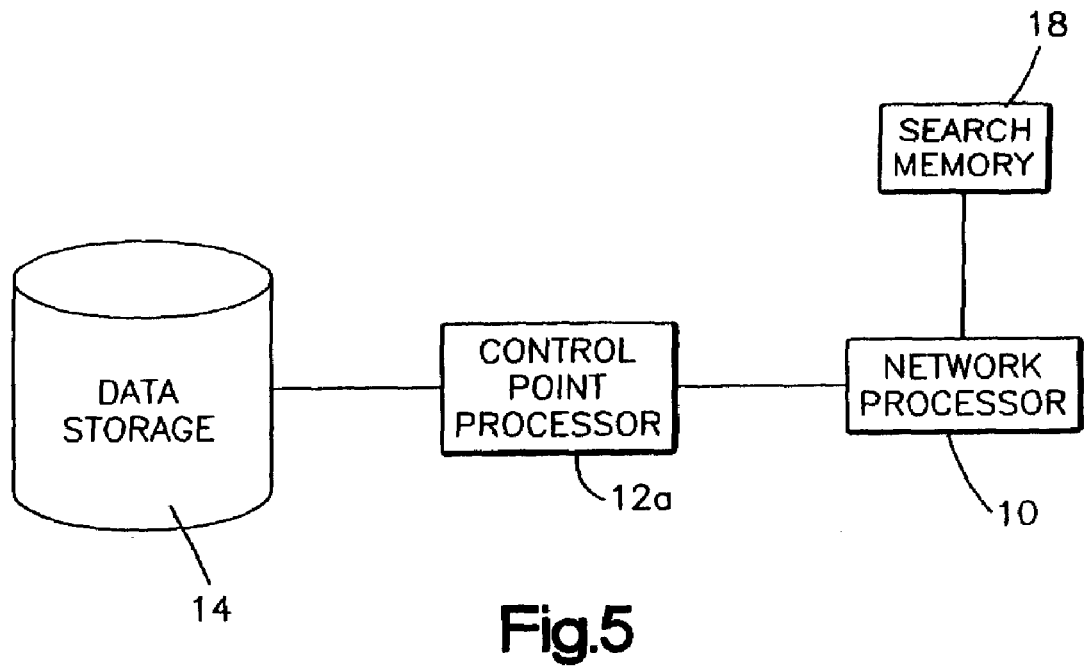
FIG. 5 depicts the operation of a single network processor to search a large key table.

Alternatively, in the case of large key tables, this situation can be handled as shown in FIG. 5 wherein the CPU 12 includes a control point processor (CP) function; when this CP function is included, the CPU is designated with the reference character 12a. The CP 12a is interposed between the NP 10 and main storage or database 14. In this case, the key table 16 may be segmented and downloaded to the search memory 18 of the NP 10 in sections that can be accommodated in the search tables of the NP 10. The CP 12a can do a first order look-up to determine which search table to download to the NP 10, (e.g. use telephone area code to select blocks of numbers to download to search memory).

In the case of accessing a very large key table, the key table 16 is broken into sections, and the sections loaded incrementally and searched until a match is found. (This last option assumes that the time required to load a new section of the key table 16 is small compared to the look-up/search time.)

Figure 6:
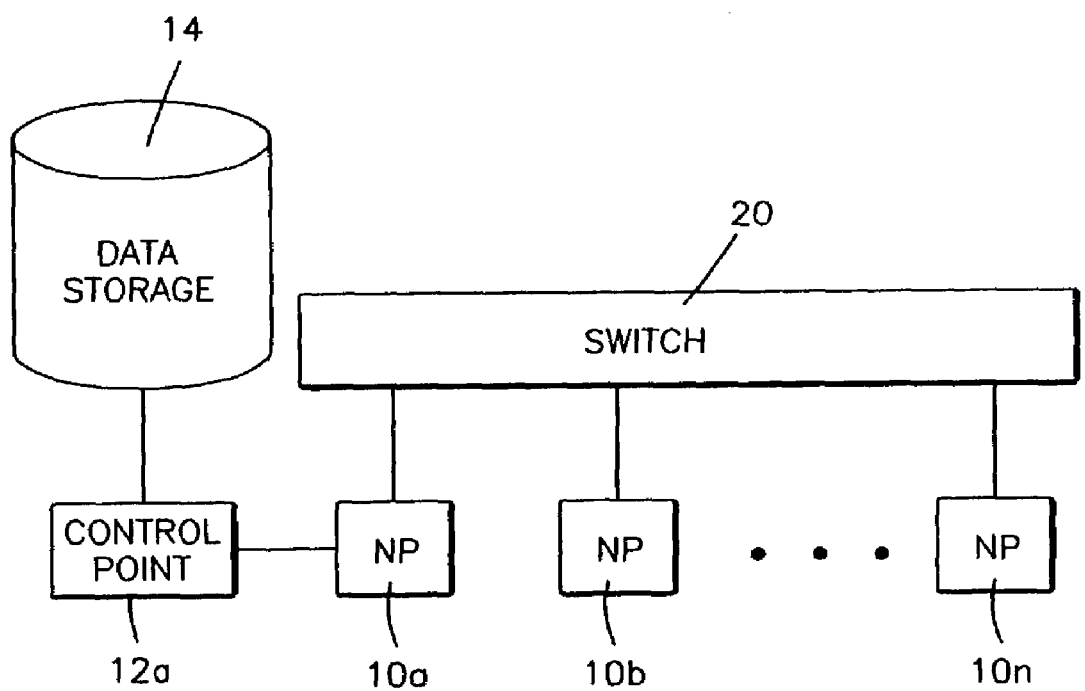
FIG. 6 depicts a scheme for searching concomitantly several network processors using different keys for each.

FIG. 6 depicts a scheme wherein several network processors are used to concomitantly search different keys, or a very large lookup table is distributed to two or more network processors. In this scheme, several network processors 10a, 10b, . . . 10n are shown. In one embodiment, the keys are broken into sections, with each section being loaded into one of the NP's 10a, 10b, . . . 10n. The search keys are multicast to all of the NPs 10a, 10b, . . . 10n from the CP 12a for simultaneous look-up. The CP 12a provides the information for the tables and the key types that each NP 10a, 10b, . . . 10n should use. This can be done by the CP 12a sending all of the keys to all of the NPs 10a, 10b, . . . 10n, and switch 20 can provide each of the NPs 10a, 10b, . . . 10n with the segment of the key search. This information is generated by the CP 12a. Alternatively, the CP 12a can send to each NP 10a, 10b, . . . 10n the set of keys it is programmed to search, and each NP 10a, 10b, . . . 10n will search its designated set of keys.

The switch, in this application, first provides a communication mechanism between the CP 12a and each of the NP's 10a, 10b, . . . 10n, and also allows the NP's 10a, 10b, . . . 10n to communicate with each other; for example, to pass on search results when multiple NP's 10 are used in a pipeline organization.

What is claimed is:

1. A method of searching a database for a match of any one of a plurality of keys, comprising the steps of:
   providing at least one network processor, each having a plurality of pico processors or packet processors;
   providing at least one key table containing sets of keys and an associated function with each key;
   providing a CPU operatively connected to a network processor;
   supplying a pre-formatted data record to be searched to said CPU, said pre-formatting including separately identified and searchable fields corresponding to said sets of keys;
   delivering said pre-formatted records to said network processor or processors from said CPU;
   searching, in said network processor or processors, at least one of said searchable fields in said pre-formatted data field against at least one set of keys stored in said key table; and
   if a match is found, returning the matched key and the associated function to the CPU.

2. The invention as defined in claim 1 wherein there are a plurality of network processors and each network processor is programmed to search a different key set.

3. The invention as defined in claim 2 wherein a different key set is stored in each network processor.

4. The invention as defined in claim 2 wherein a single key set is distributed among at least two network processors.

5. The invention as defined in claim 1 wherein a single network processor is provided.

6. The invention as defined in claim 3 wherein each of the packet processors is programmed to search on a different key set.

7. The invention as defined in claim 2 wherein a different key search is sent to each network processor.

8. The invention as defined in claim 2 wherein the entire search key is transmitted to each network processor.

9. A method of creating a database and search keys for a match of any one of a plurality of keys in a key table, comprising the steps of:
   providing at least one network processor, each having a plurality of packet processors;
   providing at least one key table containing sets of keys and an associated function with each key;
   providing a data storage facility;
   providing a CPU operatively connected to each network processor and to said data storage facility;
   supplying pre-formatted data records and search keys to be searched to said CPU, said pre-formatting including separately identified and searchable fields corresponding to said sets of keys; and
   delivering said pre-formatted data records to said data storage facility and said search keys associated therewith, together with the associated function, to said network processor or processors from said CPU.

10. The invention as defined in claim 9 wherein there are multiple network processors.

11. The invention as defined in claim 10 wherein a different key set is stored in each network processor.

12. The invention as defined in claim 10 wherein a single key set is distributed among at least two network processors.

13. The invention as defined in claim 9 wherein there is a single network processor in which the key sets are stored.

* * * * *